US012694231B2

(12) United States Patent
Akerlund et al.

(10) Patent No.: US 12,694,231 B2
(45) Date of Patent: Jul. 28, 2026

(54) GENERATING MULTI-MODAL RESPONSE(S) THROUGH UTILIZATION OF LARGE LANGUAGE MODEL(S)

(71) Applicant: GOOGLE LLC, Mountain View, CA (US)

(72) Inventors: Oscar Akerlund, Zurich (CH); Evgeny Sluzhaev, Zurich (CH); Golnaz Ghiasi, Mountain View, CA (US); Thang Luong, Santa Clara, CA (US); Yifeng Lu, Mountain View, CA (US); Igor Petrovski, Zurich (CH); Ágoston Weisz, Zurich (CH); Wei Yu, Mountain View, CA (US); Rakesh Shivanna, Sunnyvale, CA (US); Michael Andrew Goodman, Oakland, CA (US); Apoorv Kulshreshtha, Mountain View, CA (US); Yu Du, Sunnyvale, CA (US); Amin Ghafouri, San Francisco, CA (US); Sanil Jain, Sunnyvale, CA (US); Dustin Tran, San Francisco, CA (US); Vikas Peswani, Mountain View, CA (US); YaGuang Li, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 279 days.

(21) Appl. No.: 18/413,495

(22) Filed: Jan. 16, 2024

(65) Prior Publication Data

US 2025/0053751 A1 Feb. 13, 2025

Related U.S. Application Data

(63) Continuation of application No. 18/370,683, filed on Sep. 20, 2023, now Pat. No. 11,907,674.

(Continued)

(51) Int. Cl.
*G06F 40/00* (2020.01)
*G06F 40/40* (2020.01)

(52) U.S. Cl.
CPC .................................... *G06F 40/40* (2020.01)

(58) Field of Classification Search
CPC ............ G06N 3/08; G06N 20/00; G06N 3/04; G06N 3/044; G06N 3/02; G06N 5/04;
(Continued)

(56) References Cited

U.S. PATENT DOCUMENTS 10,459,995 B2 10/2019 Lev-Tov
11,361,571 B1 6/2022 Fusco
(Continued)

FOREIGN PATENT DOCUMENTS

WO 2023101743 A1 6/2023

OTHER PUBLICATIONS

A. Ghosh and K. Deepa, "QueryMintAI: Multipurpose Multimodal Large Language Models for Personal Data," in IEEE Access, vol. 12, pp. 144631-144651, 2024. (Year: 2024).*
(Continued)

*Primary Examiner* — Edgar X Guerra-Erazo
(74) *Attorney, Agent, or Firm* — Gray Ice Higdon

(57) ABSTRACT

Implementations relate to generating multi-modal response (s) through utilization of large language model(s) (LLM(s)). Processor(s) of a system can: receive natural language (NL) based input, generate a multi-modal response that is responsive to the NL based output, and cause the multi-modal response to be rendered. In some implementations, and in generating the multi-modal response, the processor(s) can process, using a LLM, LLM input (e.g., that includes at least the NL based input) to generate LLM output, and determine, based on the LLM output, textual content for inclusion in the multi-modal response and multimedia content for inclusion
(Continued)

in the multi-modal response. In some implementations, the multimedia content can be obtained based on a multimedia content tag that is included in the LLM output and that is indicative of the multimedia content. In various implementations, the multimedia content can be interleaved between segments of the textual content.

20 Claims, 7 Drawing Sheets

Related U.S. Application Data

(60) Provisional application No. 63/518,253, filed on Aug. 8, 2023.

(58) Field of Classification Search
CPC ........ G06N 20/10; G06N 20/20; G06N 5/025; G06N 5/01; G06N 5/00; G06N 7/01; G06N 3/045; G06N 5/042; G06N 5/046; G06N 5/045; G06N 5/043; G10L 15/16; G10L 15/1815; G10L 25/30; G10L 15/00; G10L 13/08; G10L 15/02; G06F 40/40; G06F 40/268; G06F 40/279; G06F 40/30; G06F 40/295; G06F 40/284; G06F 40/253; G06F 40/20
See application file for complete search history.

(56) References Cited

U.S. PATENT DOCUMENTS

| | | | | |
|---|---|---|---|---|
| 11,449,684 | B2 | 9/2022 | Luong | |
| 11,907,674 | B1 | 2/2024 | Akerlund | |
| 2019/0361729 | A1 | 11/2019 | Gruber et al. | |
| 2019/0384826 | A1 | 12/2019 | Doggett | |
| 2020/0342018 | A1 | 10/2020 | Lange | |
| 2021/0089724 | A1* | 3/2021 | Luong | G06F 40/40 |
| 2022/0157308 | A1 | 5/2022 | Fink et al. | |
| 2022/0237435 | A1* | 7/2022 | Huang | G06N 3/08 |
| 2023/0326212 | A1 | 10/2023 | Viral | |
| 2024/0347058 | A1* | 10/2024 | Rossi | G10L 13/08 |
| 2025/0014606 | A1 | 1/2025 | Chung | |

OTHER PUBLICATIONS

X. Wang, B. Zhuang and Q. Wu, "ModaVerse: Efficiently Transforming Modalities with LLMs," 2024 IEEE/CVF Conference on Computer Vision and Pattern Recognition (CVPR), Seattle, WA, USA, 2024, pp. 26596-26606. (Year: 2024).*

Thirunavukarasu, A.J., Ting, D.S.J., Elangovan, K. et al. Large language models in medicine. Nat Med 29, 1930-1940 (2023) (Year: 2023).*

Li, H. et al., "TextBind: Multi-turn Interleaved Multimodal Instruction—following"; arXiv.org, Cornell University; arXiv:2309.08637; 20 pages; dated Sep. 14, 2023.

Wu, S. et al., "NExT-GPT: Any-to-Any Multimodal LLM"; arXiv.org, Cornell University; arXiv:2309.05519; 22 pages; dated Sep. 13, 2023.

Radford, A. et al; Improving Language Understanding by Generative Pre-Training; Preprint, Work in progress; 12 pages; dated 2018.

Radford, A. et al; Language Models are Unsupervised Multitask Learners; OpenAI blog; 1(8), 9; 24 pages; dated 2019.

Brown et al.; Language Models are Few-Shot Learners; Advances in newral information processing systems; 33, 1877-1901; dated 2020.

Editor; Generative AI models explained; AltexSoft: https://www.altexsoft.com/blog/generative-ai/; 21 pages; dated Oct. 13, 2023.

NVIDIA; What's Generative AI? https://web.archive.org/web/20230323225348/https://ndivia.com/en-en/glossary/data-science/generative-ai/; 11 pages; dated Mar. 23, 2023.

Peters, M. E. et al.; Semi-supervised Sequence Tagging with Bidirectional Language Models; Allen Institute for Artificial Intelligence; 10 pages; dated Apr. 29, 2017.

Li, C et al.; TagGPT: Large Language Models are Zero-shot Multimodal Taggers: 13 pages; dated Apr. 6, 2023.

Mccoy, Julia; Discover How AI Turns Your Text Prompts into Harmonious Music; 42 pages; dated Aug. 9, 2023.

Sandzer-Bell, Ezra; WavTool: The World's First Text-to-Music AI DAW Uses GPT-4; 24 pages; dated Apr. 23, 2023.

VEED.IO; AI Music Generator; 13 pages; dated Nov. 23, 2023.

Mewknows, r/OpenAI; "Did you know you can make ChatGPT send images?"; retrieved from the internet: URL:https://www.reddit.com/r/OpenAI/comments/zh4kf4/did_you_know_you_can_make_chatgpt_send_images/?sort=confidence&rdt=65127 [retrieved on Oct. 24, 2024]; 8 pages; dated Dec. 9, 2022.

European Patent Office; International Search Report and Written Opinion issued in Application No. PCT/US2024/039822; 14 pages; dated Nov. 12, 2024.

Diaz, M.; Bing Chat can Now Respond to Questions with Images, Charts, and Other Visual Elements; ZDNET; 7 pages; dated May 15, 2023.

Mehdi, Y.; Reinventing Search with a New AI-powered Microsoft Bing and Edge, your Copilot for the Web, Microsoft; 6 pages; dated Feb. 7, 2023.

* cited by examiner

300

OBTAIN A PLURALITY OF TRAINING INSTANCES TO BE UTILIZED IN FINE-TUNING A LLM, EACH OF THE PLURALITY OF TRAINING INSTANCES INCLUDING: (1) A CORRESPONDING NL BASED INPUT; AND (2) A CORRESPONDING MULTI-MODAL RESPONSE THAT IS RESPONSIVE TO THE CORRESPONDING NL BASED INPUT, THE CORRESPONDING MULTI-MODAL RESPONSE INCLUDING CORRESPONDING TEXTUAL CONTENT AND CORRESPONDING MULTIMEDIA CONTENT TAG(S) INDICATIVE OF CORRESPONDING MULTIMEDIA CONTENT ITEM(S) TO BE INCLUDED IN THE CORRESPONDING MULTI-MODAL RESPONSE 352

FINE-TUNE, BASED ON A GIVEN TRAINING INSTANCE, FROM AMONG THE PLURALITY OF TRAINING INSTANCES, THE LLM 354

CONTINUE FINE-TUNING? 358

YES

NO

CAUSE THE LLM TO BE DEPLOYED FOR UTILIZATION IN GENERATING SUBSEQUENT MULTI-MODAL RESPONSES THAT ARE RESPONSIVE TO SUBSEQUENT NL BASED INPUTS THAT ARE ASSOCIATED WITH CLIENT DEVICES OF USERS 360

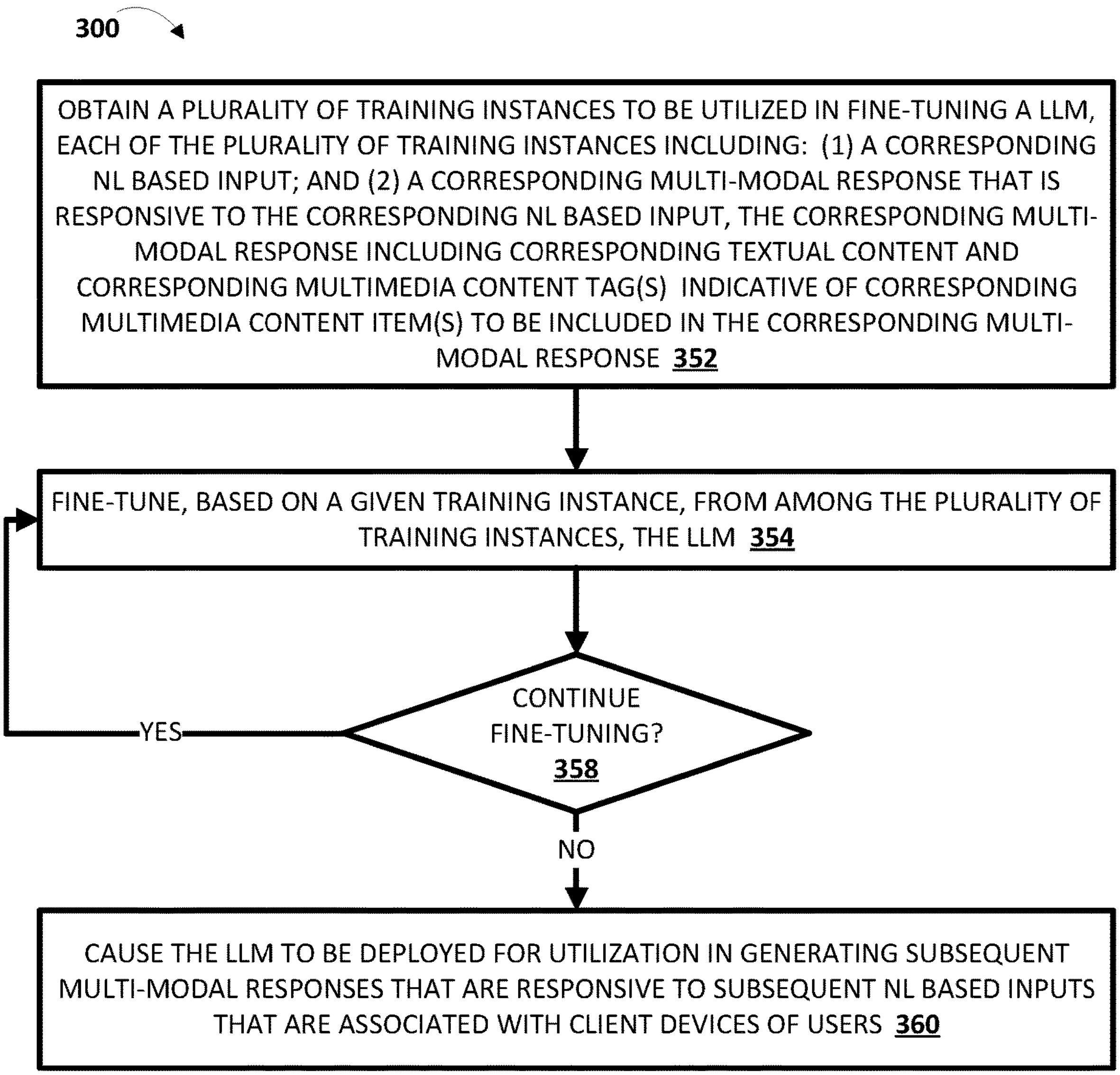

RECEIVE NL BASED INPUT ASSOCIATED WITH A CLIENT DEVICE 452

PROCESS, USING A LLM, LLM INPUT TO GENERATE LLM OUTPUT, THE LLM INPUT INCLUDING AT LEAST THE NL BASED INPUT 454

MULTI-MODAL RESPONSE? 456

YES

NO

DETERMINE, BASED ON THE LLM OUTPUT, TEXTUAL CONTENT TO BE INCLUDED IN A MULTI-MODAL RESPONSE THAT IS RESPONSIVE TO THE NL BASED INPUT AND MULTIMEDIA CONTENT TO BE INCLUDED IN THE MULTI-MODAL RESPONSE THAT IS RESPONSIVE TO THE NL BASED INPUT 458

DETERMINE, BASED ON THE LLM OUTPUT, TEXTUAL CONTENT TO BE INCLUDED IN A UNI-MODAL RESPONSE THAT IS RESPONSIVE TO THE NL BASED INPUT 462

CAUSE THE UNI-MODAL RESPONSE TO BE RENDERED AT THE CLIENT DEVICE 464

CAUSE THE MULTI-MODAL RESPONSE TO BE RENDERED AT THE CLIENT DEVICE 460

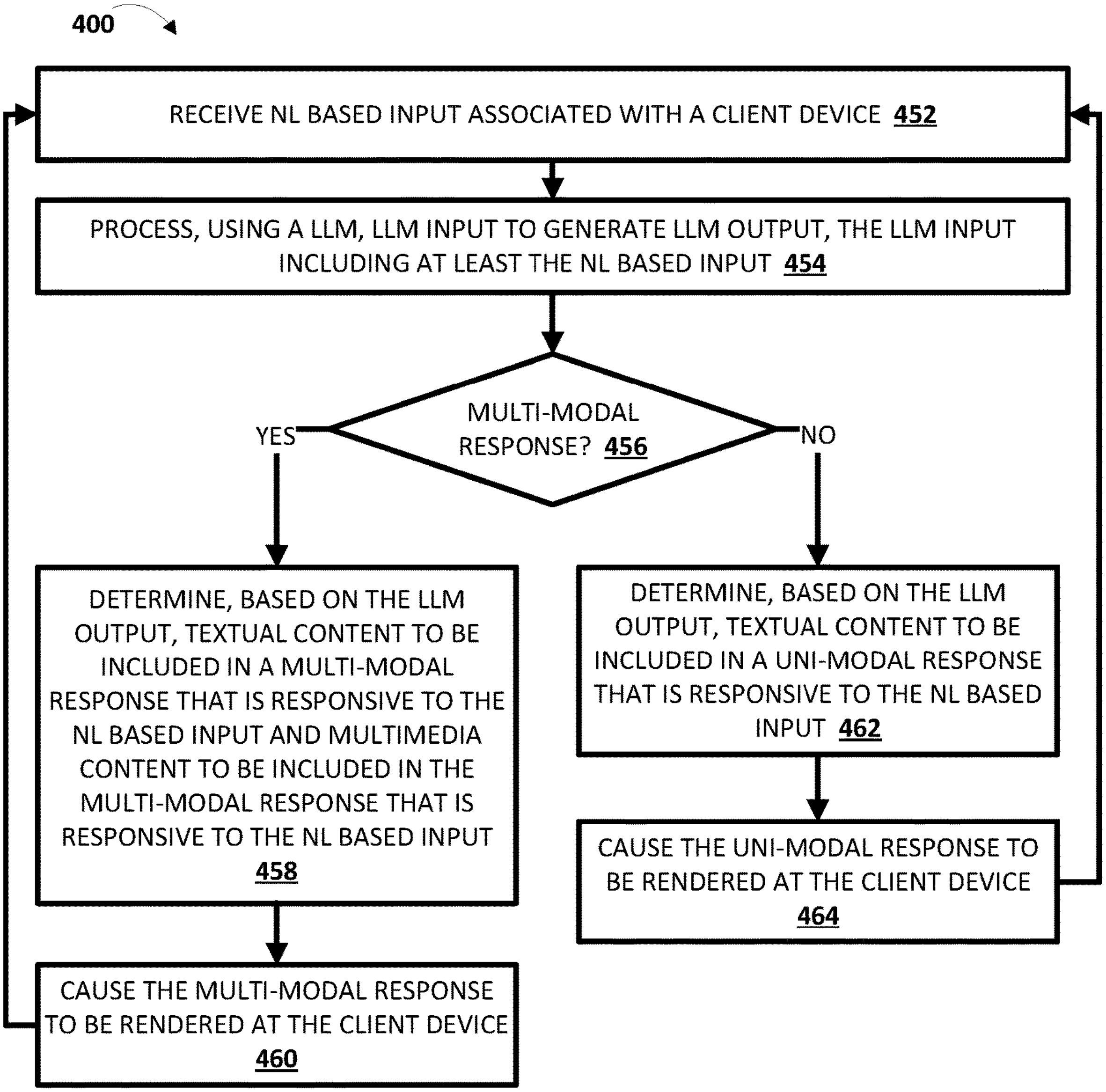

FIG. 4

GENERATING MULTI-MODAL RESPONSE(S) THROUGH UTILIZATION OF LARGE LANGUAGE MODEL(S)

BACKGROUND

Large language models (LLMs) are particular types of machine learning models that can perform various natural language processing (NLP) tasks, such as language generation, machine translation, and question-answering. These LLMs are typically trained on enormous amounts of diverse data including data from, but not limited to, webpages, electronic books, software code, electronic news articles, and machine translation data. Accordingly, these LLMs leverage the underlying data on which they were trained in performing these various NLP tasks. For instance, in performing a language generation task, these LLMs can process a natural language (NL) based input that is received from a client device, and generate a response that is responsive to the NL based input and that is to be rendered at the client device. In many instances, these LLMs can cause textual content to be included in the response. In some instances, these LLMs can additionally, or alternatively, cause multimedia content, such as images, to be included in the response. These responses that include both textual content and multimedia content are referred to herein as multi-modal responses.

However, the multimedia content in these multi-modal responses is often pre-pended or post-pended to the textual content. As a result, the multimedia content is not contextualized with respect to the textual content in these multi-modal responses. Not only does this lack of contextualization detract from the user experience, but it may also result in computational resources being unnecessarily consumed. These issues may be exacerbated when a user is interacting with these LLMs via a client device that has limited display real estate, such as a mobile phone. For instance, if the multi-modal response includes multiple paragraphs of text and a corresponding image associated with each of the multiple paragraphs of text, but all of the corresponding images are pre-pended and/or post-pended to the text, then the user may consume all of the text prior to viewing the images, or vice versa. As a result, the user may consume a portion of the textual content, then scroll up or down to view the corresponding image for that paragraph, and then scroll back up or down to continue consuming a next paragraph. However, this unnecessarily consumes computational resources, in the aggregate across a population of users, due to an increased quantity of user inputs, and prolongs a duration of the human-to-computer interaction between the user and the LLM. Thus, there is a need in the art for improved generation of multi-modal responses through utilization of LLMs.

SUMMARY

Implementations described herein relate to generating multi-modal response(s) through utilization of large language model(s) (LLM(s)). Processor(s) of a system can: receive natural language (NL) based input associated with a client device of a user, generate, using a LLM, a multi-modal response that is responsive to the NL based output and that includes both textual content and multimedia content, and cause the multi-modal response to be rendered at the client device. In various implementations, the textual content can include a plurality of textual segments, and the multimedia content can include at least one multimedia content item that is interleaved with respect to the plurality of textual segments. Accordingly, the multimedia content is logically arranged with respect to the textual content, which results in a more natural interaction that not only guides a human-to-computer interaction between the user and the system through utilization of the LLM, but also conserves computational resources in consumption of the multi-modal response.

For example, assume that the system receives NL based input of "I'm planning a trip to Rome next summer, what are the must-see attractions?" In this example, the textual content can identify various attractions across the city of Rome, such as "The Colosseum", "The Roman Forum", "The Pantheon", and so on, and each of these attractions can be associated with corresponding textual segments. Further, the multimedia content can include various multimedia content items associated with one or more of the various attractions, such as images, videos, audio, gifs, or the like. Accordingly, in generating the multi-modal response to be rendered at the client device, the system can generate the textual segment about "The Colosseum" followed by an image of "The Colosseum", the textual segment about "The Roman Forum" followed by and image of "The Roman Forum", the textual segment about "The Pantheon" followed by an image of "The Pantheon", and so on all with only a single call to the LLM (e.g., a so-called "one-shot" approach). Although the above example is described with respect to the textual segments being rendered immediately prior to the multimedia content, it should be understood that is for the sake of example and is not meant to be limiting. For instance, the multimedia content can alternatively be rendered immediately prior to the textual segments.

In some implementations, and prior to the LLM being utilized in generating the multi-modal responses, the system can fine-tune the LLM to subsequently enable the LLM to determine where the multimedia content should be included in the multi-modal responses and relative to the textual content. For example, the system can obtain a plurality of training instances where each of the plurality of training instances includes: (1) a corresponding NL based input; and (2) a corresponding multi-modal response that is responsive to the corresponding NL based input, the corresponding multi-modal response including corresponding textual content and corresponding multimedia content tag(s) indicative of corresponding multimedia content item(s) to be included in the corresponding multi-modal response. In some versions of these implementations, one or more of the plurality of training instances can be curated (e.g., by a developer associated with the system that indicates where the corresponding multimedia content tag(s) belong), whereas in additional or alternative versions of these implementations, one or more of the plurality of training instances can be automatically generated (e.g., without intervention of the developer). Further, the system can fine-tune the LLM based on the plurality of training instances to subsequently enable the LLM to generate the multi-modal responses.

In some implementations, and in generating the multi-modal response that is responsive to the NL based output and that includes both the textual content and the multimedia content, the system can cause the LLM to process LLM input to generate LLM output. In some versions of those implementations, the LLM input corresponds to the raw NL based input that was provided by the user. In additional or alternative implementations, the LLM input corresponds to the NL based input in structured form (and optionally other context(s) and/or prompt(s) (e.g., a prompt that indicates any response to the NL based input should be a multi-modal response that includes the multimedia content)). The LLM output can include, for example, a probability distribution over a sequence of tokens, such as words, phrases, or other semantic units that are predicted to be responsive to the NL based input, and/or over multimedia content tag(s) that are predicted to be responsive to the NL based input. In these implementations, the system can determine the textual content to be included in the multi-modal response based on the probability distribution over the sequence of tokens that are predicted to be responsive to the NL based input, and can determine the multimedia content to be included in the multi-modal response based on the probability distribution over the multimedia content tag(s) that are predicted to be responsive to the NL based input. In some versions of those implementations, the inclusion of the multimedia content tag(s) can be utilized as a signal that any response generated that is responsive to the NL based input should be the multi-modal response. However, it should be understood that other signals can be utilized to determine that any response generated that is responsive to the NL based input should be the multi-modal response.

For example, in additional or alternative implementations, a client device context of the client device of the user that provided the NL based input and/or a user context of the user that provided the NL based input can be utilized as a signal that any response generated that is responsive to the NL based input should be the multi-modal response. In these implementations, the client device context can include a display size of a display of the client device of the user, network bandwidth of the client device of the user, connectivity status of the client device of the user, a modality by which the NL based input was received, and/or other client device contexts. The client device context can, for instance, serve as a proxy for whether the client device is capable of efficiently rendering multimedia content (e.g., in view of bandwidth and/or connectivity considerations), whether the client device is well suited for rendering different types of multimedia content (e.g., whether the client device includes speaker(s) and/or a display), and/or otherwise indicate of whether a multi-modal response should be generated. Additionally, or alternatively, the user context can include a geographical region in which the user is located when the NL based input is received, a user account status of a user account of the user of the client device, historical NL based inputs provided by the user of the client device, or user preferences of the user of the client device, and/or other user contexts. The user context can, for instance, serve as a proxy for whether the user desires multi-modal responses (or desires multi-modal responses in certain situations) and/or otherwise indicate whether a multi-modal response should be generated. In all of the above instances, the system can cause the NL based input and/or the LLM input to be augmented with a prompt that indicates a multi-modal response that includes multimedia content should be generated.

In some implementations, and in response to determining that the LLM output includes the multimedia content tag(s), then the system can obtain the multimedia content to be included in the multi-modal response. Continuing with the above example where the NL based input is "I'm planning a trip to Rome next summer, what are the must-see attractions?", and as noted above, the multimedia content can include images, videos, audio, gifs, or the like. Accordingly, and by virtue of the fine-tuning of the LLM as described herein, the multimedia content tags can include "{tag: [image of The Colosseum in Rome]image {url: . . . }}", "{tag: [image of The Roman Forum in Rome]image {url: . . . }}", "{tag: [image of The Pantheon]image {url: . . . }}", or the like. In some versions of these implementations, the system can utilize the multimedia content tags to determine multimedia content queries to obtain multimedia content items to be included in the multi-modal response. For example, the system can determine corresponding multimedia content queries of "image of The Colosseum in Rome", "image of The Roman Forum in Rome", "image of The Pantheon in Rome", or the like, and cause the multimedia content queries to be submitted (e.g., directly by the system or by the client device associated with the user) to an image search system. Notably, although the multimedia content tags are included in the LLM output and utilized in obtaining the multimedia content tags, the multimedia content tags themselves may never be rendered or perceivable to the user that provided the NL based input.

Although the above example is described with respect to the multimedia content queries being submitted to the image search system, it should be understood that is for the sake of example and is not meant to be limiting. For instance, the multimedia content tags may additionally, or alternatively, indicate that the multimedia content to be included in the multi-modal response is video content, audio content, gif content, and/or other multimedia content. In these instances, the system can cause the multimedia content queries to be submitted over video search systems, audio data search systems, or gif search systems, respectively. In additional or alternative implementations, the system can cause the multimedia content queries to be submitted over other generative models, such as image generators, video generators, audio generators, gif generators, or the like. In these implementations, user data associated with the user that provided the NL based input can optionally be included along with the multimedia content queries (e.g., an image of the user, a video of the user, audio data capturing a voice of the user, etc.). This enables the multimedia content to be personalized to the user (e.g., rather than the image of The Colosseum just including The Colosseum, the generated image can include the user at The Colosseum).

In various implementations, and in causing the multi-modal response to be rendered at the client device, the system can cause the textual content to be rendered in a streaming manner while the multimedia content is still being obtained. Continuing with the above example where the NL based input is "I'm planning a trip to Rome next summer, what are the must-see attractions?", the textual segment associated with "The Colosseum" can be rendered at the client device (e.g., visually via a display of the client device and/or audibly via speaker(s) of the client device) while the system causes the "image of The Colosseum in Rome" to be obtained, and so on for the remaining textual segments. However, as the images are obtained, they can be inserted into the multi-modal response. This further reduces latency in causing the multi-modal response to be rendered for presentation to the user, and results in an even more natural interaction that not only guides the human-to-computer interaction between the user and the system through utilization of the LLM, but also conserves computational resources in consumption of the multi-modal response.

By using the techniques described herein, various technical advantages can be achieved. As one non-limiting example, by interleaving the textual content with the multimedia content in the multi-modal responses, a quantity of user inputs received at the client device can be reduced, thereby conserving computational resources. While the conservation of computational resources may be relatively minimal at a single client device, the conservation of computational resources, in aggregate, across a population of client devices can be substantial. For instance, users need not scroll up or down to view contextually relevant multimedia content. As another non-limiting example, logically arranging the multimedia content with respect to the textual content can result in a more natural interaction that not only guides a human-to-computer interaction between the user and the system through utilization of the LLM, but also conserves computational resources in consumption of the multi-modal response. Again, users need not scroll up or down to view contextually relevant multimedia content. As yet another non-limiting example, latency in causing the multi-modal response to be rendered can be reduced since the textual content can be rendered while the multimedia content is being obtained, and the LLM provides an indication of what the multimedia content should include via the multimedia content tags, thereby further reducing latency in actually obtaining the multimedia content.

The above description is provided as an overview of some implementations of the present disclosure. Further description of those implementations, and other implementations, are described in more detail below.

BRIEF DESCRIPTION OF THE DRAWINGS

FIG. 3 depicts a flowchart illustrating an example method of fine-tuning a large language model (LLM) to generate multi-modal response(s), in accordance with various implementations.

FIG. 4 depicts a flowchart illustrating an example method of generating multi-modal response(s) through utilization of large language model(s) (LLM(s)), in accordance with various implementations.

DETAILED DESCRIPTION OF THE DRAWINGS

Figure 1:
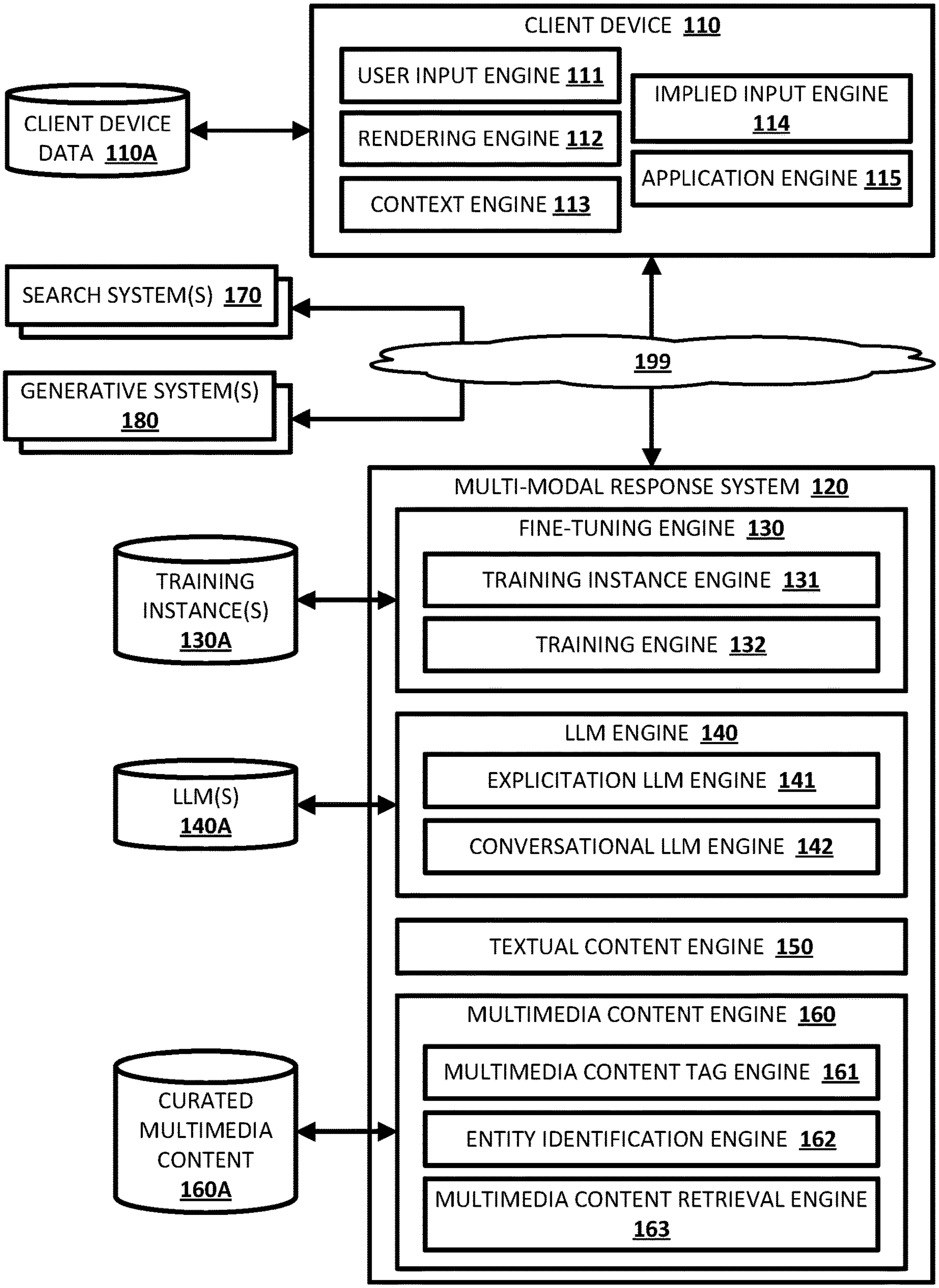
FIG. 1 depicts a block diagram of an example environment that demonstrates various aspects of the present disclosure, and in which some implementations disclosed herein can be implemented.

Turning now to FIG. 1, a block diagram of an example environment that demonstrates various aspects of the present disclosure, and in which implementations disclosed herein can be implemented is depicted. The example environment includes a client device 110 and a multi-modal response system 120. In some implementations, all or aspects of the multi-modal response system 120 can be implemented locally at the client device 110. In additional or alternative implementations, all or aspects of the multi-modal response system 120 can be implemented remotely from the client device 110 as depicted in FIG. 1 (e.g., at remote server(s)). In those implementations, the client device 110 and the multi-modal response system 120 can be communicatively coupled with each other via one or more networks 199, such as one or more wired or wireless local area networks ("LANs," including Wi-Fi, mesh networks, Bluetooth, near-field communication, etc.) or wide area networks ("WANs", including the Internet).

The client device 110 can be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

The client device 110 can execute one or more software applications, via application engine 115, through which NL based input can be submitted and/or multi-modal responses and/or other responses (e.g., uni-modal responses) that are responsive to the NL based input can be rendered (e.g., audibly and/or visually). The application engine 115 can execute one or more software applications that are separate from an operating system of the client device 110 (e.g., one installed "on top" of the operating system)—or can alternatively be implemented directly by the operating system of the client device 110. For example, the application engine 115 can execute a web browser or automated assistant installed on top of the operating system of the client device 110. As another example, the application engine 115 can execute a web browser software application or automated assistant software application that is integrated as part of the operating system of the client device 110. The application engine 115 (and the one or more software applications executed by the application engine 115) can interact with the multi-modal response system 120.

In various implementations, the client device 110 can include a user input engine 111 that is configured to detect user input provided by a user of the client device 110 using one or more user interface input devices. For example, the client device 110 can be equipped with one or more microphones that capture audio data, such as audio data corresponding to spoken utterances of the user or other sounds in an environment of the client device 110. Additionally, or alternatively, the client device 110 can be equipped with one or more vision components that are configured to capture vision data corresponding to images and/or movements (e.g., gestures) detected in a field of view of one or more of the vision components. Additionally, or alternatively, the client device 110 can be equipped with one or more touch sensitive components (e.g., a keyboard and mouse, a stylus, a touch screen, a touch panel, one or more hardware buttons, etc.) that are configured to capture signal(s) corresponding to touch input directed to the client device 110.

Some instances of a NL based input described herein can be a query for a response that is formulated based on user input provided by a user of the client device 110 and detected via user input engine 111. For example, the query can be a typed query that is typed via a physical or virtual keyboard, a suggested query that is selected via a touch screen or a mouse of the client device 110, a spoken voice query that is detected via microphone(s) of the client device 110 (and optionally directed to an automated assistant executing at least in part at the client device 110), or an image or video query that is based on vision data captured by vision component(s) of the client device 110 (or based on NL input generated based on processing the image using, for example, object detection model(s), captioning model(s), etc.). Other instances of a NL based input described herein can be a prompt for content that is formulated based on user input provided by a user of the client device 110 and detected via the user input engine 111. For example, the prompt can be a typed prompt that is typed via a physical or virtual keyboard, a suggested prompt that is selected via a touch screen or a mouse of the client device 110, a spoken prompt that is detected via microphone(s) of the client device 110, or an image or video prompt that is based on an image or video captured by a vision component of the client device 110.

In various implementations, the client device 110 can include a rendering engine 112 that is configured to render content (e.g., uni-modal responses, multi-modal responses, an indication of source(s) associated with portion(s) of the uni-modal and/or multi-modal responses, and/or other content) for audible and/or visual presentation to a user of the client device 110 using one or more user interface output devices. For example, the client device 110 can be equipped with one or more speakers that enable the content to be provided for audible presentation to the user via the client device 110. Additionally, or alternatively, the client device 110 can be equipped with a display or projector that enables the content to be provided for visual presentation to the user via the client device 110.

In various implementations, the client device 110 can include a context engine 113 that is configured to determine a client device context (e.g., current or recent context) of the client device 110 and/or a user context of a user of the client device 110 (e.g., an active user of the client device 110 when the client device 110 is associated with multiple users). In some of those implementations, the context engine 113 can determine a context based on data stored in client device data database 110A. The data stored in the client device data database 110A can include, for example, user interaction data that characterizes current or recent interaction(s) of the client device 110 and/or a user of the client device 110, location data that characterizes a current or recent location (s) of the client device 110 and/or a geographical region associated with a user of the client device 110, user attribute data that characterizes one or more attributes of a user of the client device 110, user preference data that characterizes one or more preferences of a user of the client device 110, user profile data that characterizes a profile of a user of the client device 110, and/or any other data accessible to the context engine 113 via the client device data database 110A or otherwise.

For example, the context engine 113 can determine a current context based on a current state of a dialog session (e.g., considering one or more recent inputs provided by a user during the dialog session), profile data, and/or a current location of the client device 110. For instance, the context engine 113 can determine a current context of "visitor looking for upcoming events in Louisville, Kentucky" based on a recently issued query, profile data, and an anticipated future location of the client device 110 (e.g., based on recently booked hotel accommodations). As another example, the context engine 113 can determine a current context based on which software application is active in the foreground of the client device 110, a current or recent state of the active software application, and/or content currently or recently rendered by the active software application. A context determined by the context engine 113 can be utilized, for example, in supplementing or rewriting NL based input that is formulated based on user input, in generating an implied NL based input (e.g., an implied query or prompt formulated independent of any explicit NL based input provided by a user of the client device 110), and/or in determining to submit an implied NL based input and/or to render result(s) (e.g., a response) for an implied NL based input.

In various implementations, the client device 110 can include an implied input engine 114 that is configured to: generate an implied NL based input independent of any user explicit NL based input provided by a user of the client device 110; submit an implied NL based input, optionally independent of any user explicit NL based input that requests submission of the implied NL based input; and/or cause rendering of search result(s) or a response for the implied NL based input, optionally independent of any explicit NL based input that requests rendering of the search result(s) or the response. For example, the implied input engine 114 can use one or more past or current contexts, from the context engine 113, in generating an implied NL based input, determining to submit the implied NL based input, and/or in determining to cause rendering of search result(s) or a response that is responsive to the implied NL based input. For instance, the implied input engine 114 can automatically generate and automatically submit an implied query or implied prompt based on the one or more past or current contexts. Further, the implied input engine 114 can automatically push the search result(s) or the response that is generated responsive to the implied query or implied prompt to cause them to be automatically rendered or can automatically push a notification of the search result(s) or the response, such as a selectable notification that, when selected, causes rendering of the search result(s) or the response. Additionally, or alternatively, the implied input engine 114 can submit respective implied NL based input at regular or non-regular intervals, and cause respective search result(s) or respective responses to be automatically provided (or a notification thereof automatically provided). For instance, the implied NL based input can be "patent news" based on the one or more past or current contexts indicating a user's general interest in patents, the implied NL based input or a variation thereof periodically submitted, and the respective search result(s) or the respective responses can be automatically provided (or a notification thereof automatically provided). It is noted that the respective search result(s) or the response can vary over time in view of, e.g., presence of new/fresh search result document(s) over time.

Further, the client device 110 and/or the multi-modal response system 120 can include one or more memories for storage of data and/or software applications, one or more processors for accessing data and executing the software applications, and/or other components that facilitate communication over one or more of the networks 199. In some implementations, one or more of the software applications can be installed locally at the client device 110, whereas in other implementations one or more of the software applications can be hosted remotely (e.g., by one or more servers) and can be accessible by the client device 110 over one or more of the networks 199.

Although aspects of FIG. 1 are illustrated or described with respect to a single client device having a single user, it should be understood that is for the sake of example and is not meant to be limiting. For example, one or more additional client devices of a user and/or of additional user(s) can also implement the techniques described herein. For instance, the client device 110, the one or more additional client devices, and/or any other computing devices of a user can form an ecosystem of devices that can employ techniques described herein. These additional client devices and/or computing devices may be in communication with the client device 110 (e.g., over the network(s) 199). As another example, a given client device can be utilized by multiple users in a shared setting (e.g., a group of users, a household, a workplace, a hotel, etc.).

The multi-modal response system 120 is illustrated in FIG. 1 as including a fine-tuning engine 130, a LLM engine 140, a textual content engine 150, and a multimedia content engine 160. Some of these engines can be combined and/or omitted in various implementations. Further, these engines can include various sub-engines. For instance, the fine-tuning engine 130 is illustrated in FIG. 1 as including a training instance engine 131 and a training engine 132. Further, the LLM engine 140 is illustrated in FIG. 1 as including an explicitation LLM engine 141 and a conversational LLM engine 142. Moreover, the multimedia content engine 160 is illustrated in FIG. 1 as including a multimedia content tag engine 161, an entity identification engine 162, and a multimedia content retrieval engine 163. Similarly, some of these sub-engines can be combined and/or omitted in various implementations. Accordingly, it should be understood that the various engines and sub-engines of the multi-modal response system 120 illustrated in FIG. 1 are depicted for the sake of describing certain functionalities and is not meant to be limiting.

Further, the multi-modal response system 120 is illustrated in FIG. 1 as interfacing with various databases, such as training instance(s) database 130A, training instance(s) database 132A, LLM(s) database 140A, and curated multimedia content database 160A. Although particular engines and/or sub-engines are depicted as having access to particular databases, it should be understood that is for the sake of example and is not meant to be limiting. For instance, in some implementations, each of the various engines and/or sub-engines of the multi-modal response system 120 may have access to each of the various databases. Further, some of these databases can be combined and/or omitted in various implementations. Accordingly, it should be understood that the various databases interfacing with the multi-modal response system 120 illustrated in FIG. 1 are depicted for the sake of describing certain data that is accessible to the multi-modal response system 120 and is not meant to be limiting.

Moreover, the multi-modal response system 120 is illustrated in FIG. 1 as interfacing with other system(s), such as search system(s) 170 and generative system(s) 180. In addition to multimedia content that is included in the curated multimedia content database 160A, the multimedia content retrieval engine 163 can generate and transmit requests the search system(s) 170 and/or the generative system(s) 180 to obtain multimedia content to be included in a multi-modal response as described herein. In some implementations, the search system(s) 170 and/or the generative system(s) 180 are first-party system(s), whereas in other implementations, the search system(s) 170 and/or the generative system(s) 180 are third-party system(s). As used herein, the term “first-party” refers to an entity that develops and/or maintains the multi-modal response system 120, whereas the term “third-party” or “third-party entity” refers to an entity that is distinct from the entity that develops and/or maintains the multi-modal response system 120.

As described in more detail herein (e.g., with respect to FIGS. 2, 3, 4, 5A, and 5B), the multi-modal response system 120 can be utilized to generate multi-modal responses that are responsive to corresponding NL based inputs received at the client device 110. The multi-modal responses described herein can include not only corresponding textual content that is responsive to the corresponding NL based inputs, but can also include corresponding multimedia content that is responsive to the corresponding NL based inputs. The corresponding multimedia content can include multimedia content items, such as images, video clips, audio clips, gifs, and/or any other suitable multimedia content. Notably, the corresponding multimedia content can be particularly relevant to a portion of the corresponding textual content. Accordingly, in generating the multi-modal responses, techniques described herein enable the corresponding multimedia content to be interleaved with respect to the corresponding textual content (e.g., as described with respect to FIGS. 5A and 5B). Put another way, the multimedia content items that are particularly relevant to a portion of the textual content can be rendered along with the portion of the textual content, rather than being pre-pended to the textual content or post-pended to the textual content. As a result, computational resources can be conserved since a quantity of user inputs to scroll up or down to view the multimedia content are reduced and a duration of a human-to-computer dialog is reduced. Additional description of the multi-modal response system 120 is provided herein (e.g., with respect to FIGS. 2, 3, and 4).

Figure 2:
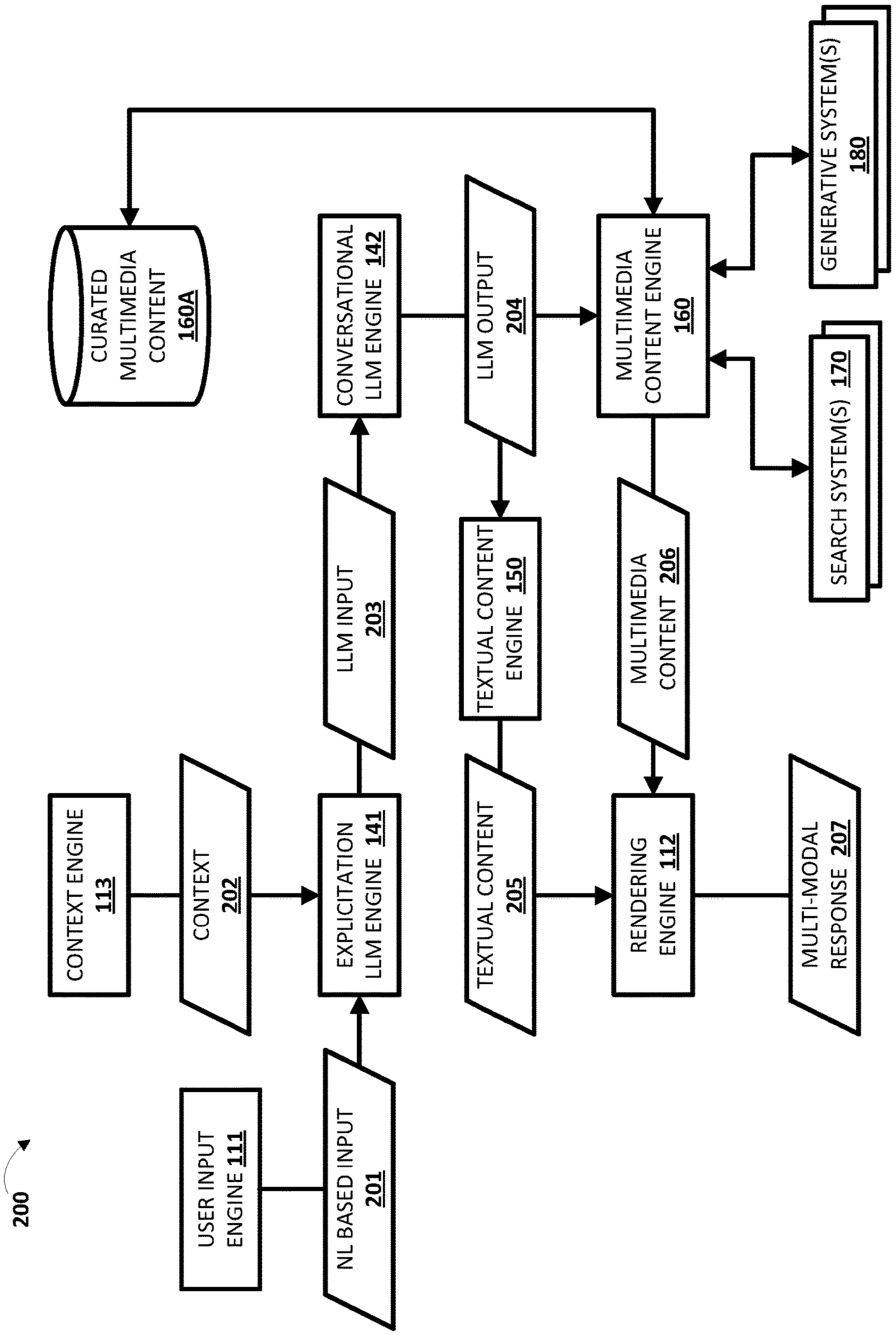
FIG. 2 depicts an example process flow of generating multi-modal response(s) through utilization of large language model(s) (LLM(s)) using various components from FIG. 1, in accordance with various implementations.

Turning now to FIG. 2, an example process flow 200 of generating multi-modal response(s) through utilization of large language model(s) (LLM(s)) using various components from FIG. 1 is depicted. For the sake of example, assume that the user input engine 111 of the client device detects NL based input 201. For instance, assume that the NL based input 201 is a query of “what are the 10 tallest buildings in the world?”. Although the process flow 200 of FIG. 2 is described with respect to the NL based input 201 being explicit NL based input, it should be understood that is for the sake of example and is not meant to be limiting. For instance, the NL based input 201 can additionally, or alternatively, be implied NL based input (e.g., as described with respect to the implied input engine 114).

Further assume that the NL based input 201 is provided to the explicitation LLM engine 141. The explicitation LLM 141 can be one form of an LLM that processes the NL based input 201 (and optionally content 202 determined by the content engine 113 of the client device) to generate LLM input 203. The LLM input 203 can then be provided to the conversational LLM engine 142 to generate LLM output 204. Put another way, the explicitation LLM 141 can process the raw NL based input 201 and put it in a structured form that is more suitable for processing by the conversational LLM engine 142. The explicitation LLM and/or the conversational LLM utilized by these respective engines can include, for example, any LLM that is stored in the LLM(s) database 140A, such as PaLM, BARD, BERT, LaMDA, Meena, GPT, and/or any other LLM, such as any other LLM that is encoder-only based, decoder-only based, sequence-to-sequence based and that optionally includes an attention mechanism or other memory, and that is fine-tuned to generate multimedia content tags as described herein (e.g., with respect to FIG. 3).

Notably, in generating the LLM input 203, the explicitation engine 141 can also process a prompt that indicates the raw NL based input 201 (and optionally the context 202) should be put in the structured form that is more suitable for processing by the conversational LLM engine 142. In some implementations, the explicitation LLM engine 141 can generate a query based on the NL based input 201, and submit the query to one or more search systems (e.g., the search system(s) 170), and process the search result document(s) in generating the LLM input 203. Further, in generating the LLM output 204, the conversational LLM engine 142 can generate the LLM output 204 as, for example, a probability distribution over a sequence of tokens, such as words, phrases, or other semantic units, and over multimedia content tags that are predicted to be responsive to the NL based input 201. The LLM can include millions or billions of weights and/or parameters that are learned through training the LLM on enormous amounts of diverse data. This enables the LLM to generate the LLM output as the probability distribution over the sequence of tokens.

Further assume that the LLM output 204 is provided to both the textual content engine 150 and the multimedia content engine 150. In this instance, the textual content engine 150 can determine, based on the probability distribution over the sequence of tokens, textual content 205 that is to be included in a multi-modal response 207 that is responsive to the NL based input. Continuing with the above example where the NL based input is the query of "what are the 10 tallest buildings in the world?", the textual content 205 can include a list of the 10 tallest buildings in the world, and optionally other information associated with each of the buildings in the list (e.g., where each of the respective buildings are located, a respective height of each of the respective buildings, when each of the respective buildings was completed, how many floors each of the respective buildings have, and/or other information).

Also, in this instance, the multimedia content engine can determine, based on the probability distribution over the sequence of tokens, multimedia content 206 that is to be included in the multi-modal response 207 that is responsive to the NL based input. As noted above, the conversational LLM utilized by the conversational LLM engine 142 to generate the LLM output 204 can be fine-tuned to generate multimedia content tags (e.g., as described with respect to FIG. 3). The multimedia content tag engine 161 can parse the LLM output 204 itself and/or the textual content 205 to identify these multimedia content tags. Continuing with the above example where the NL based input is the query of "what are the 10 tallest buildings in the world?", the multimedia content tags can indicate multimedia content 206 that is to be included in the multi-modal response 207. As one non-limiting example, the multimedia content tags can be, for instance, "{tag: [image of the tallest building in the world]image {url: . . . }}", "{tag: [image of the second tallest building in the world]image {url: . . . }}", "{tag: [image of the third tallest building in the world]image {url: . . . }}", and so on for each of the 10 tallest buildings in the world. Notably, and by virtue of how the conversational LLM utilized by the conversational LLM engine 142 is fine-tuned, the multimedia content tags can be interleaved with respect to the textual content 205.

Put another way, the textual content 205 may include a plurality of portions of textual content, such as "The tallest building is the world is . . . ", "The second tallest building in the world is . . . ", "The third tallest building in the world is . . . ", and so on for each of the 10 tallest building in the world. However, the textual content 205 may be interleaved with the multimedia content tags that indicate the multimedia content 206 that is to be included in the multi-modal response 207, such as "The tallest building is the world is . . . ", "{tag: [image of the tallest building in the world]image {url: . . . }}", "The second tallest building in the world is . . . ", "{tag: [image of the second tallest building in the world]image {url: . . . }}", "The third tallest building in the world is . . . ", "{tag: [image of the third tallest building in the world]image {url: . . . }}", and so on for each of the 10 tallest buildings in the world.

However, it should be noted that the multimedia content tags are not included in the multi-modal response 207 that is rendered for presentation to the user that provided the NL based input 201. Rather, the multimedia content tags are replaced with the multimedia content 207. Accordingly, the entity identification engine 162 can determine, based on multimedia content tags, multimedia content queries. Continuing with the above example, the entity identification engine 162 can determine multimedia content queries based on the multimedia content tags, such as a first multimedia content query of "[image of the tallest building in the world]" based on the multimedia content tag "{tag: [image of the tallest building in the world] image {url: . . . }}", a second multimedia content query of "[image of the second tallest building in the world]" based on the multimedia content tag "{tag: [image of the second tallest building in the world]image {url: . . . }}", a third multimedia content query of "[image of the third tallest building in the world]" based on the multimedia content tag "{tag: [image of the third tallest building in the world] image {url: . . . }}", and so on.

Notably, the entity identification engine 162 can identify the entities with varying degrees of granularity, and the above example is not meant to be limiting. For instance, rather than the first multimedia content query of "[image of the tallest building in the world]", the first multimedia content query can be "[image of the Burj Khalifa in Dubai]". Similarly, rather than the second multimedia content query of "[image of the second building in the world]", the second multimedia content query can be "[image of the Shanghai Tower in Shanghai]". Accordingly, it should be understood that any entities described herein are for the sake of example and are not meant to be limiting.

Further, the multimedia content retrieval engine 163 can cause the multimedia content queries to be issued. Continuing with the above example, the first multimedia content query can be submitted to an image search system (e.g., one of the search system(s) 170) to obtain an image of the Burj Khalifa in Dubai, the second multimedia content query can be submitted to the image search system to obtain an image of the Shanghai Tower in Shanghai, the third multimedia content query can be submitted to the image search system to obtain an image of the Makkah Royal Clock Tower in Mecca, and so on. Accordingly, in rendering the multi-modal 207 response, the rendering engine 112 of the client device 110 can visually render the textual content 205 corresponding to the plurality of segments for the 10 tallest buildings in the world, and the multimedia content 206 corresponding to the multimedia content items for the images of the 10 tallest buildings in the world.

Notably, the rendering engine 112 can initiate rendering of the textual content 205 prior to the multimedia content 206 being obtained to reduce latency in rendering the multi-modal response 207. In some implementations, the multimedia content engine 160 can cause the client device 110 to issue the multimedia content queries such that the multimedia content items are directly obtained by the client device 110, thereby further reducing latency in rendering the multi-modal response 207. Thus, a duration of the human-to-computer interaction between the user and the multi-modal response system 120 can be reduced.

Although the above example is described with respect to the multimedia content items being obtained via an image search system, it should be understood that is for the sake of example and is not meant to be limiting. In additional or alternative implementations, the multimedia content items can be obtained from other multimedia search systems (e.g., video search systems, audio search systems, gif search systems, and/or other multimedia content search systems). In these implementations, the search system utilized to obtain the multimedia content items may be dependent on what type of multimedia content is indicated by the multimedia content tags. In additional or alternative implementations, multimedia content items can be obtained from the curated multimedia content database 160A. In these implementations, the multimedia content retrieval engine 163 can submit the multimedia search queries over the curated multimedia content database 160A if the entity identified by the entity identification engine 162 in the multimedia content tag is a particular type of entity that, for example, may be considered sensitive, personal, controversial, etc. For instance, if the multimedia content tag indicates that an image of the President of the United States should be included in the multi-modal response 207, then an official presidential headshot from the curated multimedia content database 160A can be obtained as the multimedia content 206. In additional or alternative implementations, multimedia content items can be obtained from the generative system(s) 180. In these implementations, the multimedia content retrieval engine 163 can submit the multimedia search queries over the generative system(s) 180 to cause, for example, image(s), video(s), audio to be generated using a generative model (e.g., an image generator, a video generator, an audio generator, etc.).

Moreover, although the above example is described with respect to determining that the response that is responsive to the NL based input 201 should be a multi-modal response that includes both the textual content 205 and the multimedia content 206 based on the LLM output 204 and/or the textual content 205 including the multimedia content tags, it should be understood that is for the sake of example and is not meant to the be limiting. Rather, it should be understood other signals can be utilized (e.g., as described with respect to FIG. 4), such as an explicit intent or inferred intent that the response should be a multi-modal response and/or other contextual signals associated with the client device of the user and/or the user. In implementations where it is determined that the response that is responsive to the NL based input 201 should be a multi-modal response that includes both the textual content 205 and the multimedia content 206 prior to the NL based input being processed by the explicitation LLM engine 141, the explicitation engine 141 can also process a prompt that indicates the response should be a multi-modal response.

Turning now to FIG. 3, a flowchart illustrating an example method 300 of fine-tuning a large language model (LLM) to generate multi-modal response(s) is depicted. For convenience, the operations of the method 300 are described with reference to a system that performs the operations. This system of the method 300 includes one or more processors, memory, and/or other component(s) of computing device(s) (e.g., client device 110 of FIG. 1, multi-modal response system 120 of FIG. 1, computing device 610 of FIG. 6, one or more servers, and/or other computing devices). Moreover, while operations of the method 300 are shown in a particular order, this is not meant to be limiting. One or more operations may be reordered, omitted, and/or added.

At block 352, the system obtains a plurality of training instance to be utilized in fine-tuning a LLM, each of the plurality of training instances including: (1) a corresponding NL based input; and (2) a corresponding multi-modal response that is responsive to the corresponding NL based input, the corresponding multi-modal response including corresponding textual content and corresponding multimedia content tag(s) indicative of corresponding multimedia content item(s) to be included in the corresponding multi-modal response. For example, the system can cause the training instance engine 131 from FIG. 1 to obtain the plurality of training instances. In some implementations, one or more of the plurality of training instances can be curated by, for example, a developer that is associated with the multi-modal response system 120 from FIG. 1. For instance, the corresponding NL based input and the corresponding textual content of the multi-modal response can be obtained from conversation logs, and the developer can manually add the corresponding multimedia content tag(s) into the textual content where the corresponding multimedia content item(s) should be included in the multi-modal response. In additional or alternative implementations, one or more of the plurality of training instances can be generated using an automated process. For instance, the corresponding NL based input and the corresponding textual content of the multi-modal response can be obtained from conversation logs, and the corresponding multimedia content tag(s) can be automatically inserted into the textual content where the corresponding multimedia content item(s) should be included in the multi-modal response. Upon being obtained and/or generated, the training instance engine 131 from FIG. 1 can store the plurality of training instances in the training instance(s) database 130A from FIG. 1.

At block 354, the system fine-tunes, based on a given training instance, from among the plurality of training instances, the LLM. For example, the training engine 132 from FIG. 1 can obtain the given training instance from the training instance(s) database 130A. Further, the training engine 132 can cause the LLM to process the corresponding NL based input and the corresponding multi-modal response of the given training instance. Notably, since the corresponding multi-modal response includes the corresponding multimedia content tag(s) indicative of the corresponding multimedia content item(s) to be included in the corresponding multi-modal response, the LLM is effectively fine-tuned to perform a specific task of determining when to include the corresponding multimedia content tag(s) and where to include them with respect to the corresponding textual content. Notably, the LLM that is being fine-tuned can be the conversational LLM that is utilized by the conversational LLM engine 142 from FIG. 1.

At block 358, the system determines whether to continue fine-tuning the LLM. The system can determine to continue fine-tuning the LLM until one or more conditions are satisfied. The one or more conditions can include, for example, whether the LLM has been fine-tuned based on a threshold quantity of training instances, whether a threshold duration of time has passed since the fine-tuning process began, whether performance of the LLM has achieved a threshold level of performance, and/or other conditions.

If, at an iteration of block 358, the system determines to continue fine-tuning the LLM, then the system returns to block 354. At a subsequent iteration of block 354, the system fine-tunes, based on a given additional training instance, from among the plurality of training instances, the LLM. The system can continue fine-tuning the LLM in this manner until the one or more conditions are satisfied at subsequent iterations of block 358.

If, at an iteration of block 358, the system determines not to continue fine-tuning the LLM, then the system proceeds to block 360. At block 360, the system causes the LLM to be deployed for utilization in generating multi-modal responses that are responsive to subsequent NL based inputs that are associated with client devices of users (e.g., as described with respect to FIG. 4).

Turning now to FIG. 4, a flowchart illustrating an example method 400 of generating multi-modal response(s) through utilization of large language model(s) (LLM(s)) is depicted. For convenience, the operations of the method 300 are described with reference to a system that performs the operations. This system of the method 300 includes one or more processors, memory, and/or other component(s) of computing device(s) (e.g., client device 110 of FIG. 1, multi-modal response system 120 of FIG. 1, computing device 610 of FIG. 6, one or more servers, and/or other computing devices). Moreover, while operations of the method 300 are shown in a particular order, this is not meant to be limiting. One or more operations may be reordered, omitted, and/or added.

At block 452, the system receives NL based input associated with a client device. The NL based input can be any explicit NL based input (e.g., described with respect to the user input engine 111 from FIG. 1) or implicit NL based input (e.g., described with respect to the implied input engine 114 from FIG. 1) described herein.

At block 454, the system processes, using a LLM, LLM input to generate LLM output, the LLM input including at least the NL based input. In some implementations, the system can cause the explicitation LLM engine 141 from FIG. 1 to process the raw NL based input (and optionally any context or other prompts), using an explicitation LLM (e.g., stored in the LLM(s) database 140A from FIG. 1), to generate the LLM input. In these implementations, the system can cause the conversational LLM engine 142 from FIG. 1, to process, using a conversational LLM (e.g., stored in the LLM(s) database 140A from FIG. 1 and fine-tuned according to the method 300 of FIG. 3), the LLM input to generate the LLM output. However, in various implementations, the explicitation LLM engine 141 from FIG. 1 can be omitted, and the LLM input can correspond to the raw NL based input (and optionally any context or other prompts). As noted above with respect to the process flow 200 of FIG. 2, the LLM output can include, for example, a probability distribution over a sequence of tokens, such as words, phrases, or other semantic units, and optionally multimedia content tags that are predicted to be responsive to the NL based input. The LLM can include millions or billions of weights and/or parameters that are learned through training the LLM on enormous amounts of diverse data. This enables the LLM to generate the LLM output as the probability distribution over the sequence of tokens.

At block 456, the system determines whether to generate a multi-modal response that is responsive to the NL based input. In some implementations, the system can determine to generate a multi-modal response that is responsive to the NL based input in response to determining that the LLM output includes one or more multimedia content tags. In additional or alternative implementations, the system can determine to generate a multi-modal response that is responsive to the NL based input in response to determining that textual content, that is determined based on the LLM output, includes one or more multimedia content tags. However, it should be understood that these are only two signals contemplated herein, and are not meant to be limiting.

For example, the system can additionally, or alternatively, determine whether to generate a multi-modal response that is responsive to the NL based input prior to the LLM input being processed by the LLM. For instance, the system can determine whether to generate a multi-modal response that is responsive to the NL based input based on a client device context associated with the client device from which the NL based input is received. In these instances, the client device context can include a display size of a display of the client device of the user, network bandwidth of the client device of the user, connectivity status of the client device of the user, a modality by which the NL based input was received, and/or other client device contexts. The client device context can, for instance, serve as a proxy for whether the client device is capable of efficiently rendering multimedia content (e.g., in view of bandwidth and/or connectivity considerations), whether the client device is well suited for rendering different types of multimedia content (e.g., whether the client device includes speaker(s) and/or a display), and/or otherwise indicate of whether a multi-modal response should be generated.

Also, for instance, the system can determine whether to generate a multi-modal response that is responsive to the NL based input based on a user context of a user associated with the client device from which the NL based input is received. In these instances, the user context can include a geographical region in which the user is located when the NL based input is received, a user account status of a user account of the user of the client device, historical NL based inputs provided by the user of the client device, or user preferences of the user of the client device, and/or other user contexts. The user context can, for instance, serve as a proxy for whether the user desires multi-modal responses (or desires multi-modal responses in certain situations) and/or otherwise indicate whether a multi-modal response should be generated. In all of the above instances, the system can cause the NL based input and/or the LLM input to be augmented with a prompt that indicates a multi-modal response that includes multimedia content should be generated.

If, at an iteration of block 456, the system determines to generate a multi-modal response that is responsive to the NL based input, then the system proceeds to block 458. At block 458, the system determines, based on the LLM output, textual content to be included in a multi-modal response that is responsive to the NL based input and multimedia content to be included in the multi-modal response that is responsive to the NL based input. At block 460, the system causes the multi-modal response to be rendered at the client device. For example, the system can cause the textual content engine 150 from FIG. 1 to determine the textual content, and can cause the multimedia content engine 160 from FIG. 1 to determine the multimedia content (e.g., as described with respect to the process flow 200 of FIG. 2). The system returns to block 452 to continue with another iteration of the method 400 of FIG. 4 based on additional NL based input that is received, or waits to initiate another iteration of the method 400 of FIG. 4 when additional NL based input is received.

If, at an iteration of block 456, the system determines not to generate a multi-modal response that is responsive to the NL based input, then the system proceeds to block 462. At block 462, the system determines, based on the LLM output, textual content to be included in a uni-modal response that is responsive to the NL based input. At block 464, the system causes the uni-modal response to be rendered at the client device. For example, the system can cause the textual content engine 150 from FIG. 1 to determine the textual content (e.g., as described with respect to the process flow 200 of FIG. 2), but refrain from causing the multimedia content engine 160 to obtain any multimedia content. The system returns to block 452 to continue with another iteration of the method 400 of FIG. 4 based on additional NL based input that is received, or waits to initiate another iteration of the method 400 of FIG. 4 when additional NL based input is received.

Figure 5A:
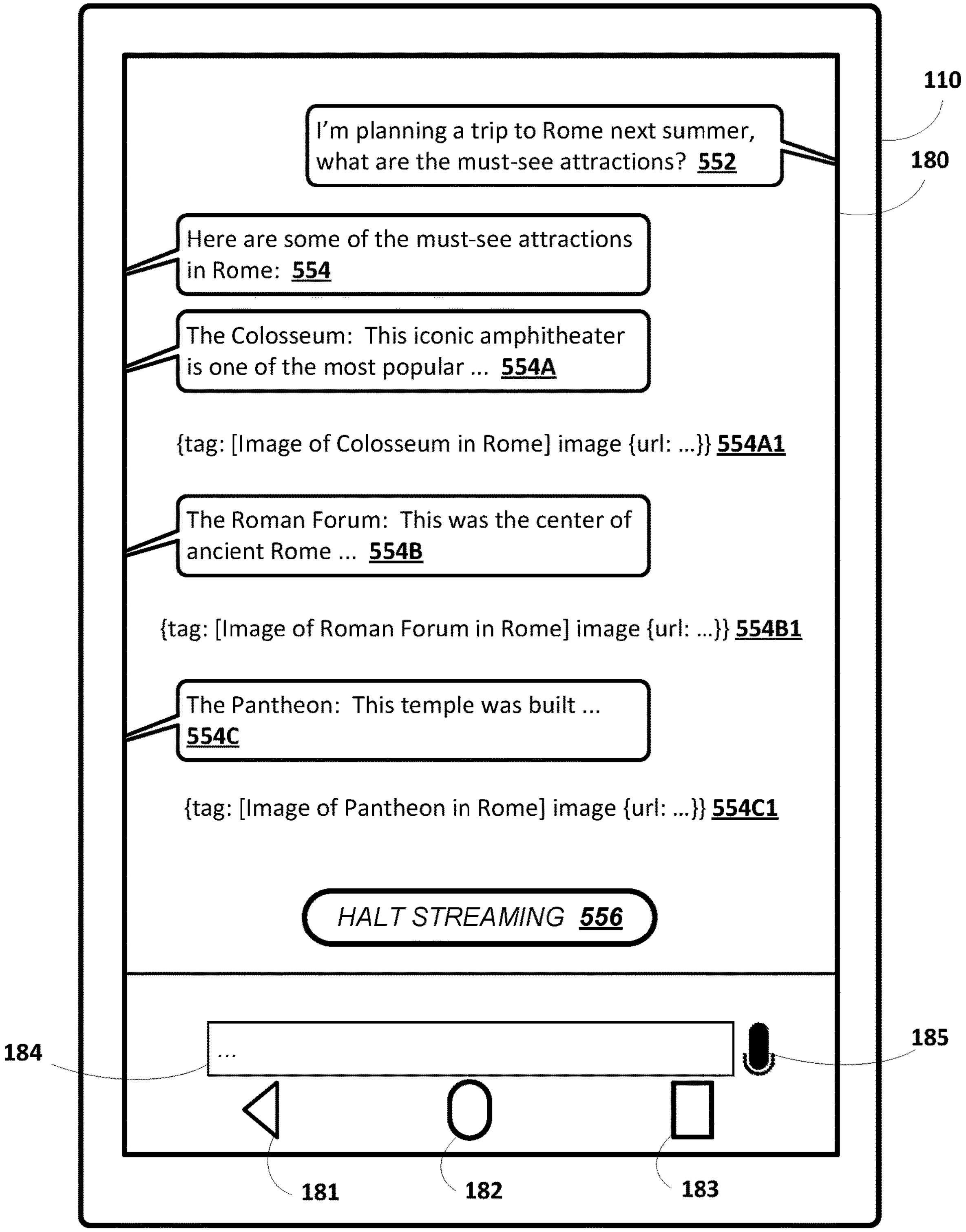
FIG. 5A and FIG. 5B depict various non-limiting examples of generating multi-modal response(s) through utilization of large language model(s) (LLM(s)), in accordance with various implementations.
Figure 5B:
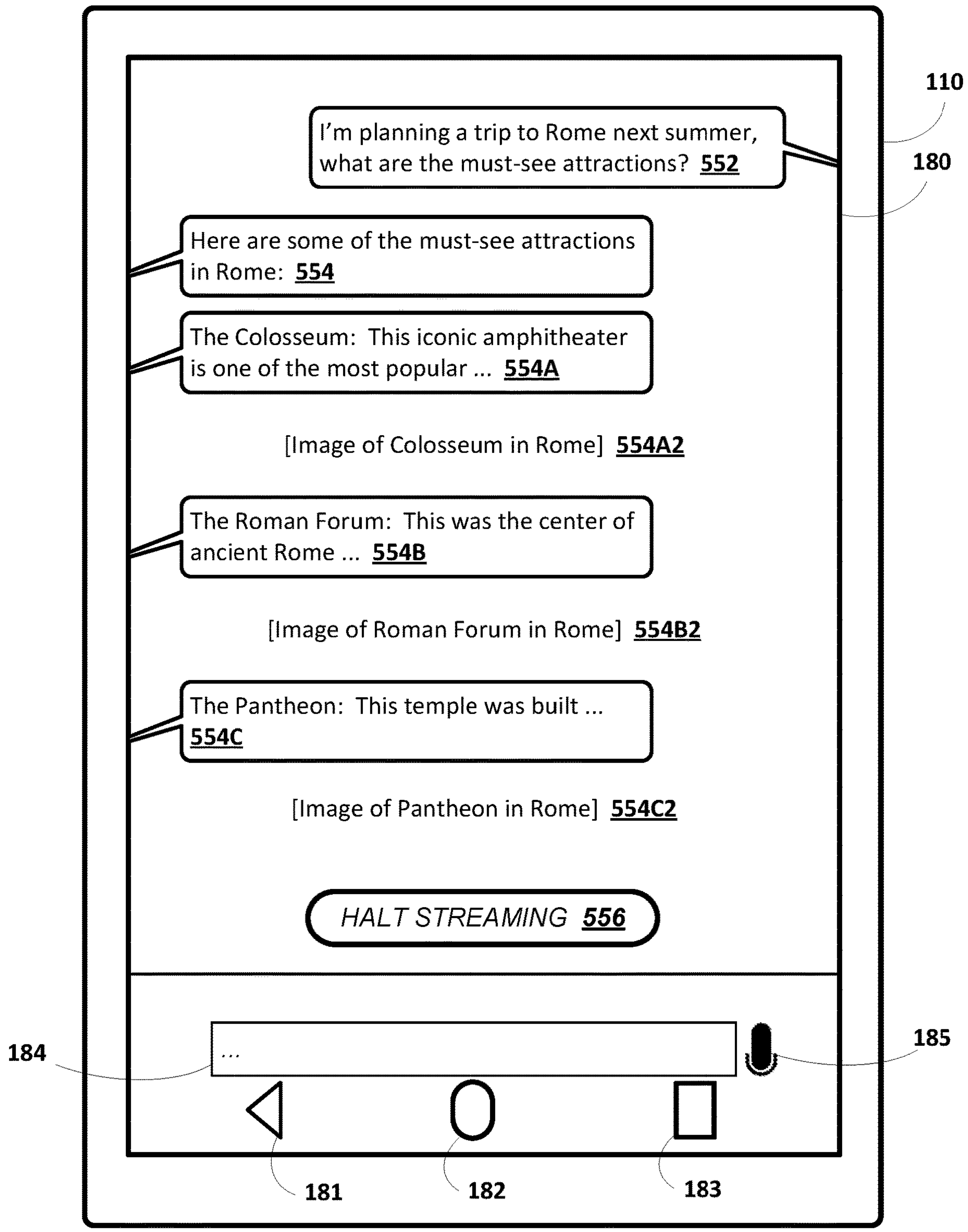

Turning now to FIGS. 5A and 58, various non-limiting examples of generating multi-modal response(s) through utilization of large language model(s) (LLM(s)) are depicted. The client device 110 (e.g., the client device 110 from FIG. 1) may include various user interface components including, for example, microphone(s) to generate audio data based on spoken utterances and/or other audible input, speaker(s) to audibly render synthesized speech and/or other audible output, and/or a display 180 to visually render visual output. Further, the display 180 of the client device 110 can include various system interface elements 181, 182, and 183 (e.g., hardware and/or software interface elements) that may be interacted with by a user of the client device 110 to cause the client device 110 to perform one or more actions. The display 180 of the client device 110 enables the user to interact with content rendered on the display 180 by touch input (e.g., by directing user input to the display 180 or portions thereof (e.g., to a text entry box 184, to a keyboard (not depicted), or to other portions of the display 180)) and/or by spoken input (e.g., by selecting microphone interface element 185—or just by speaking without necessarily selecting the microphone interface element 185 (i.e., an automated assistant may monitor for one or more terms or phrases, gesture(s) gaze(s), mouth movement(s), lip movement(s), and/or other conditions to activate spoken input) at the client device 110). Although the client device 110 depicted in FIGS. 5A and 5B is a mobile phone, it should be understood that is for the sake of example and is not meant to be limiting. For example, the client device 110 may be a standalone speaker with a display, a standalone speaker without a display, a home automation device, an in-vehicle system, a laptop, a desktop computer, and/or any other device capable of executing an automated assistant to engage in a human-to-computer dialog session with the user of the client device 110.

Referring specifically to FIG. 5A, for the sake of example, assume that a user of the client device 110 provides NL based input 552 of "I'm planning a trip to Rome next summer, what are the must-see attractions?" Further assume that a system (e.g., the multi-modal response system 120 from FIG. 1) processes at least the NL based input 552 using an LLM (e.g., that is fine-tuned as described with respect to FIG. 3) to generate LLM output for a multi-modal response 554 (e.g., as described with respect to FIGS. 2 and 4). For instance, assume that the LLM output for the multi-modal response 554 includes a plurality of textual segments, including at least a first textual segment 554A that indicates "The Colosseum" is a must-see attraction in Rome, a second textual segment 554B that indicates "The Roman Forum" is a must-see attraction in Rome, and a third textual segment 554C that indicates "The Pantheon" is a must-see attraction in Rome. Further assume that the LLM output for the multi-modal response 554 includes a plurality of multimedia content tags including at least a first multimedia content tag 554A1 that is associated with the first textual segment 554A that indicates "The Colosseum" is a must-see attraction in Rome, a second multimedia content tag 554B1 that is associated with the second textual segment 5548 that indicates "The Roman Forum" is a must-see attraction in Rome, and a third multimedia content tag 554C1 that is associated with the third textual segment 554C that indicates "The Pantheon" is a must-see attraction in Rome.

Notably, the multimedia content tags 554A1, 554B1, and 554C1 are interleaved with respect to the corresponding textual segments 554A, 5548, and 554C such that the first multimedia content tag 554A1 is included in the LLM output after the first textual segment 554A and both are associated with "The Colosseum", the second multimedia content tag 554B1 is included in the LLM output after the second textual segment 554B and both are associated with "The Roman Forum", and the third multimedia content tag 554C1 is included in the LLM output after the third textual segment 554C and both are associated with "The Pantheon". However, it should be understood that in various implementations, the multimedia content tags 554A1, 55481, and 554C1 are not rendered (e.g., visually and/or audibly) for presentation to the user such that they are not perceivable by the user. Rather, the multimedia content tags 554A1, 554B1, and 554C1 serve as a placeholder for where the multimedia content for the multi-modal response 554 will be inserted.

Referring specifically to FIG. 5B, and continuing with the above example, the first multimedia content tag 554A1 that is associated with the first textual segment 554A that indicates "The Colosseum" is a must-see attraction in Rome can be replaced with an image 554A2 of "The Colosseum", the second multimedia content tag 55481 that is associated with the second textual segment 554B that indicates "The Roman Forum" is a must-see attraction in Rome can be replaced with an image 55482 of "The Roman Forum", and the third multimedia content tag 554C1 that is associated with the third textual segment 554C that indicates "The Pantheon" is a must-see attraction in Rome can be replaced with an image 554C2 of "The Pantheon".

Notably, the corresponding textual segments 554A, 5548, and 554C can be visually and/or audibly rendered for presentation to the user as they are obtained by the client device 110, and prior to the images 554A2, 55462, and 554C2 being obtained. Put another way, the client device 110 can stream the corresponding textual segments 554A, 554B, and 554C as it is obtained, but leave space to insert the images 554A2, 55482, and 554C2 as they are obtained in the spaces left for the images. This enables latency in rendering of the multi-modal response 554 to be reduced. Further, a halt streaming selectable element 556 can be provided and, when selected, any streaming of the multi-modal response 554 can be halted to further preserve computational resources if the user decides to no longer receive the multi-modal response 554.

Further, in some implementations, the images 554A2, 554B2, and 554C2 can be rendered along with an indication of a corresponding source of each of the images 554A2, 554B2, and 554C2 (e.g., a uniform resource locator (URL) or the like). Moreover, in some implementations, each of the corresponding images 554A2, 554B2, and 554C2 (or the indication of the corresponding source of each of the images 554A2, 55482, and 554C2) can be selectable and, when selected, can cause the client device 110 to navigate (e.g., via a web browser or other application accessible via the application engine 115) to the corresponding source of each of the images 554A2, 55482, and 554C2.

Although FIGS. 5A and 5B are described with respect to the multimedia included in the multi-modal response 554 being images, it should be understood that is for the sake of example and is not meant to be limiting. In additional or alternative implementations, the multimedia can be video, audio, gifs, and/or other multimedia content. Further, although each of the images 554A2, 554B2, and 554C2 are described with respect to including images of only the respective attractions, it should be understood that is for the sake of example and is not meant to be limiting. In additional or alternative implementations, an image of the user of the client device 110 can be provided as input to, for example, an image generator along with a prompt of "include this person in an image of The Colosseum in Rome", "include this person in an image of The Roman Forum in Rome", and "include this person in an image of The Pantheon in Rome" to make it appear as if the user is included in the images, thereby personalizing the dialog to the user that provided the NL based input 552.

Figure 6:
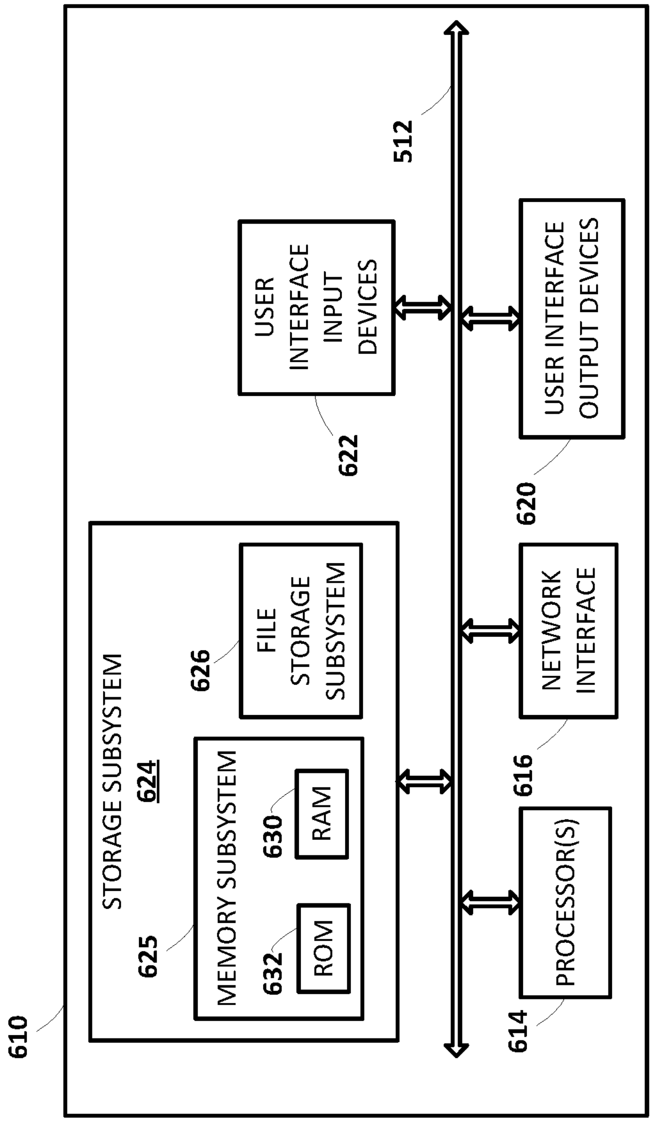
FIG. 6 depicts an example architecture of a computing device, in accordance with various implementations.

Turning now to FIG. 6, a block diagram of an example computing device 610 that may optionally be utilized to perform one or more aspects of techniques described herein is depicted. In some implementations, one or more of a client device, multi-modal response system component(s) or other cloud-based software application component(s), and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods disclosed herein, as well as to implement various components depicted in FIGS. 1 and 2.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem 612 may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes: receiving natural language (NL) based input associated with a client device of a user; and generating a multi-modal response that is responsive to the NL based input. Generating the multi-modal response that is responsive to the NL based input includes: processing, using a large language model (LLM), LLM input to generate LLM output, the LLM input including at least the NL based input; determining, based on the LLM output, textual content for inclusion in the multi-modal response and a multimedia content tag that is indicative of multimedia content that is to be included in the multi-modal response; and obtaining, based on the multimedia content tag, the multimedia content for inclusion in the multi-modal response. The method further includes causing the multi-modal response to be rendered at the client device of the user.

These and other implementations of technology disclosed herein can optionally include one or more of the following features.

In some implementations, obtaining the multimedia content for inclusion in the multi-modal response may include: determining, based on the multimedia content tag, a multimedia content query; and obtaining, based on the multimedia content query, the multimedia content for inclusion in the multi-modal response.

In some versions of those implementations, obtaining the multimedia content for inclusion in the multi-modal response based on the multimedia content query may include: submitting, to one or more databases, the multimedia content query; and in response to submitting the multimedia content query to the one or more databases, obtaining the multimedia content.

In additional or alternative versions of those implementations, obtaining the multimedia content for inclusion in the multi-modal response based on the multimedia content query may include: submitting, to a generative multimedia content model, the multimedia content query; and in response to submitting the multimedia content query to the generative multimedia content model, obtaining the multimedia content.

In additional or alternative versions of those implementations, determining the multimedia content query based on the multimedia content tag may include: identifying an entity that is included in the multimedia content tag; and determining, based on the entity that is included in the multimedia content tag, the multimedia content query.

In some further of the additional or alternative versions of those implementations, the method may further include, in response to determining that the entity that is included in the multimedia content tag is a particular type of entity: submitting, to a curated database, the multimedia content query; and in response to submitting the multimedia content query to the curated database, obtaining the multimedia content.

In some implementations, the textual content that is included in the multi-modal response may include a plurality of textual segments, and the multimedia content that is included in the multi-modal response may include a multimedia content item that is interleaved between a first textual segment, of the plurality of textual segments, and a second textual segment, of the plurality of textual segments.

In some versions of those implementations, the method may further include replacing, in the multi-modal response, the multimedia content tag with the multimedia content item.

In additional or alternative versions of those implementations, the method may further include: determining, based on the LLM output, an additional multimedia content tag that is indicative of additional multimedia content that is to be included in the multi-modal response; and obtaining, based on the additional multimedia content tag, the additional multimedia content for inclusion in the multi-modal response.

In some further of the additional or alternative versions of those implementations, the multimedia content that is included in the multi-modal response may further include an additional multimedia content item that is interleaved between the second textual segment, of the plurality of textual segments, and a third textual segment, of the plurality of textual segments.

In some yet further of the additional or alternative versions of those implementations, the method may further include: replacing, in the multi-modal response, the additional multimedia content tag with the additional multimedia content item.

In some implementations, the method may further include: determining whether to include the multimedia content in the multi-modal response, wherein determining whether to include the multimedia content in the multi-modal response is in response to determining that the LLM output includes the multimedia content tag.

In some implementations, the method may further include: determining whether to include the multimedia content in the multi-modal response, wherein determining whether to include the multimedia content in the multi-modal response is in response to determining that the textual content includes the multimedia content tag.

In some implementations, the method may further include: determining whether to include the multimedia content in the multi-modal response. Determining whether to include the multimedia content in the multi-modal response may be based on a client device context associated with the client device of the user or a user context associated with the user of the client device.

In some versions of those implementations, the client device context associated with the client device of the user may include one or more of: a display size of a display of the client device of the user, network bandwidth of the client device of the user, connectivity status of the client device of the user, or a modality by which the NL based input was received.

In additional or alternative versions of those implementations, the user context associated with the user of the client device may include one or more of: a geographical region in which the user is located when the NL based input is received, a user account status of a user account of the user of the client device, historical NL based inputs provided by the user of the client device, or user preferences of the user of the client device.

In some implementations, the method may further include, prior to processing the LLM input to generate the LLM output using the LLM: processing, using an explicitation LLM, the NL based input and one or more historical NL based inputs provided by the user of the client device, to generate the LLM input.

In some versions of those implementations, the LLM input may further includes a prompt that indicates the multimedia content should be included in the multi-modal response.

In some implementations, the multimedia content may include one or more of: an image, a video or video clip, a gif, or an audio clip.

In some implementations, the NL based input may not explicitly include a request that any multimedia content be rendered at the client device of the user.

In some implementations, the multimedia content tag that is indicative of multimedia content that is to be included in the multi-modal response may not be rendered at the client device of the user.

In some implementations, causing the multi-modal response to be rendered at the client device of the user may include: causing the textual content to be visually rendered via a display of the client device; and causing the multimedia content to be visually rendered via the display of the client device and/or audibly rendered via one or more speakers of the client device.

In some versions of those implementations, causing the textual content to be visually rendered may be while the multimedia content is being obtained, and causing the multimedia content to be visually rendered and/or audibly rendered may be in response to the multimedia content being obtained.

In additional or alternative versions of those implementations, the multimedia content may be visually rendered and/or audibly rendered along with an indication of a corresponding source of the multimedia content.

In some further of the additional or alternative versions of those implementations, the multimedia content may be selectable, and, when the multimedia content is selected, the client device may navigate to the corresponding source of the multimedia content.

In some implementations, the method may further include, prior to receiving the NL based input associated with the client device of the user: fine-tuning, based on a plurality of training instances, the LLM.

In some versions of those implementations, each training instance, of the plurality of training instance, may include:

a corresponding natural language (NL) based input, and a corresponding multi-modal response that is responsive to the corresponding NL based input, the corresponding multi-modal response including corresponding textual content and a corresponding multimedia content tag that is indicative of multimedia content that is to be included in the corresponding multi-modal response.

In some implementations, a method implemented by one or more processors is provided, and includes: receiving natural language (NL) based input associated with a client device of a user; and generating a multi-modal response that is responsive to the NL based input. Generating the multi-modal response that is responsive to the NL based input includes: processing, using a large language model (LLM), LLM input to generate LLM output, the LLM input including at least the NL based input; and determining, based on the LLM output, textual content for inclusion in the multi-modal response and multimedia content for inclusion in the multi-modal response, wherein the textual content includes a plurality of textual segments, and wherein the multimedia content includes a multimedia content item. The method further includes causing the multi-modal response to be rendered at the client device of the user. Causing the multi-modal response to be rendered at the client device of the user includes: causing the plurality of textual segments to be visually rendered via a display of the client device; and causing the multimedia content item to be visually rendered via the display of the client device and/or via one or more speakers of the client device. The multimedia content item is interleaved between a first textual segment, of the plurality of textual segments, and a second textual segment, of the plurality of textual segments.

In some implementations, a method implemented by one or more processors is provided, and includes: obtaining a plurality of training instances to be utilized in fine-tuning a large language model (LLM). Each training instance, of the plurality of training instance, includes: a corresponding natural language (NL) based input, and a corresponding multi-modal response that is responsive to the corresponding NL based input, the corresponding multi-modal response including corresponding textual content and a corresponding multimedia content tag that is indicative of corresponding multimedia content that is to be included in the corresponding multi-modal response. The method further includes fine-tuning, based on the plurality of training instances, the LLM; and causing the LLM to be deployed for utilization in generating subsequent multi-modal responses that are responsive to subsequent NL based inputs that are associated with client devices of users.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more computer readable storage media (e.g., transitory and/or non-transitory) storing computer instructions executable by one or more processors to perform any of the aforementioned methods. Some implementations also include a computer program product including instructions executable by one or more processors to perform any of the aforementioned methods.

What is claimed is:

1. A method implemented by one or more processors, the method comprising:

obtaining a plurality of training instances to be utilized in fine-tuning a large language model (LLM), wherein each training instance, of the plurality of training instances, includes:

a corresponding natural language (NL) based input, and a corresponding multi-modal response that is responsive to the corresponding NL based input, the corresponding multi-modal response including corresponding textual content and a corresponding multimedia content tag that is indicative of corresponding multimedia content that is to be included in the corresponding multi-modal response;

fine-tuning, based on the plurality of training instances, the LLM; and causing the LLM to be deployed for utilization in generating subsequent multi-modal responses that are responsive to subsequent NL based inputs that are associated with client devices of users.

2. The method of claim 1, wherein the corresponding NL based input and the corresponding textual content of the corresponding multi-modal response, for one or more of the plurality of training instances, are obtained from conversation logs between users and the LLM.

3. The method of claim 2, wherein one or more of the plurality of training instances are curated by a developer that is associated with the LLM.

4. The method of claim 3, further comprising:

receiving input from the developer that indicates where the corresponding multimedia content tag, that is indicative of where the corresponding multimedia content, is to be included in the corresponding multi-modal response.

5. The method of claim 2, wherein one or more of the plurality of training instances are automatically generated.

6. The method of claim 5, further comprising:

automatically inserting the corresponding multimedia content tag, that is indicative of where the corresponding multimedia content is to be included, in the corresponding multi-modal response.

7. The method of claim 1, wherein fine-tuning the LLM based on a given training instance, from among the plurality of training instances, comprises:

processing, using the LLM, the corresponding NL based input, of the given training instance, and the corresponding multi-modal response of the given training instance.

8. The method of claim 7, wherein fine-tuning the LLM based on the given training instance causes the LLM to determine when to include the corresponding multimedia content tag that is indicative of the corresponding multimedia content.

9. The method of claim 7, wherein fine-tuning the LLM based on the given training instance causes the LLM to determine where to include the corresponding multimedia content tag that is indicative of the corresponding multimedia content and with respect to the corresponding textual content of the corresponding multi-modal response.

10. The method of claim 1, wherein causing the LLM to be deployed for utilization in generating the subsequent multi-modal responses is in response to determining one or more conditions are satisfied.

11. The method of claim 10, wherein the one or more conditions comprise one or more of: the LLM being fine-tuned based based on a threshold quantity of training instances, the LLM being fine-tuned for a threshold duration of time, or performance of the LLM satisfying a threshold level of performance.

12. A system comprising:

at least one processor; and memory storing instructions that, when executed, cause the at least one processor to be operable to:

obtain a plurality of training instances to be utilized in fine-tuning a large language model (LLM), wherein each training instance, of the plurality of training instances, includes:

a corresponding natural language (NL) based input, and a corresponding multi-modal response that is responsive to the corresponding NL based input, the corresponding multi-modal response including corresponding textual content and a corresponding multimedia content tag that is indicative of corresponding multimedia content that is to be included in the corresponding multi-modal response;

fine-tuning, based on the plurality of training instances, the LLM; and cause the LLM to be deployed for utilization in generating subsequent multi-modal responses that are responsive to subsequent NL based inputs that are associated with client devices of users.

13. The system of claim 12, wherein the corresponding NL based input and the corresponding textual content of the corresponding multi-modal response, for one or more of the plurality of training instances, are obtained from conversation logs between users and the LLM.

14. The system of claim 13, wherein one or more of the plurality of training instances are curated by a developer that is associated with the LLM.

15. The system of claim 13, wherein the at least one processor is further operable to:

receive input from the developer that indicates where the corresponding multimedia content tag, that is indicative of where the corresponding multimedia content, is to be included in the corresponding multi-modal response.

16. The system of claim 13, wherein one or more of the plurality of training instances are automatically generated.

17. The system of claim 16, wherein the at least one processor is further operable to:

automatically insert the corresponding multimedia content tag, that is indicative of where the corresponding multimedia content is to be included, in the corresponding multi-modal response.

18. The system of claim 12, wherein fine-tuning the LLM based on a given training instance, from among the plurality of training instances, comprises:

processing, using the LLM, the corresponding NL based input, of the given training instance, and the corresponding multi-modal response of the given training instance.

19. The system of claim 18, wherein fine-tuning the LLM based on the given training instance causes the LLM to determine when to include the corresponding multimedia content tag that is indicative of the corresponding multimedia content, and wherein fine-tuning the LL M based on the given training instance causes the LLM to determine where to include the corresponding multimedia content tag that is indicative of the corresponding multimedia content and with respect to the corresponding textual content of the corresponding multi-modal response.

20. A non-transitory computer-readable storage medium storing instructions that, when executed, cause at least one processor to perform operations, the operations comprising:

obtaining a plurality of training instances to be utilized in fine-tuning a large language model (LLM), wherein each training instance, of the plurality of training instances, includes:

a corresponding natural language (NL) based input, and a corresponding multi-modal response that is responsive to the corresponding NL based input, the corresponding multi-modal response including corresponding textual content and a corresponding multimedia content tag that is indicative of corresponding multimedia content that is to be included in the corresponding multi-modal response;

fine-tuning, based on the plurality of training instances, the LLM; and causing the LLM to be deployed for utilization in generating subsequent multi-modal responses that are responsive to subsequent NL based inputs that are associated with client devices of users.

* * * * *